United States Patent
Roshan Ghias et al.

(10) Patent No.: US 11,437,026 B1
(45) Date of Patent: Sep. 6, 2022

(54) PERSONALIZED ALTERNATE UTTERANCE GENERATION

(71) Applicant: Amazon Technologies, Inc., Seattle, WA (US)

(72) Inventors: Alireza Roshan Ghias, Seattle, WA (US); Chenlei Guo, Redmond, WA (US); Pragaash Ponnusamy, Seattle, WA (US); Clint Solomon Mathialagan, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 228 days.

(21) Appl. No.: 16/672,834

(22) Filed: Nov. 4, 2019

(51) Int. Cl.
*G10L 15/197* (2013.01)
*G10L 15/22* (2006.01)
*G10L 15/06* (2013.01)
*G10L 15/18* (2013.01)

(52) U.S. Cl.
CPC .......... *G10L 15/197* (2013.01); *G10L 15/063* (2013.01); *G10L 15/1815* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,024,195 B2* | 9/2011 | Mozer | ...................... | G10L 15/22 704/275 |
| 8,521,526 B1* | 8/2013 | Lloyd | ...................... | G10L 15/01 704/236 |
| 9,953,637 B1* | 4/2018 | Di Fabbrizio | .......... | G10L 15/22 |
| 2006/0020464 A1* | 1/2006 | Ju | ............................ | G10L 15/08 704/257 |
| 2006/0155548 A1* | 7/2006 | Ichihara | .................. | G10L 15/30 704/275 |
| 2006/0173686 A1* | 8/2006 | Hwang | .................... | G10L 15/06 704/257 |
| 2007/0168337 A1* | 7/2007 | Onodera | ................. | G10L 15/00 |
| 2007/0294084 A1* | 12/2007 | Cross | ............................ | 704/251 |
| 2017/0076726 A1* | 3/2017 | Bae | ......................... | G10L 15/22 |
| 2017/0242847 A1* | 8/2017 | Li | ............................ | G06F 40/51 |
| 2018/0137857 A1* | 5/2018 | Zhou | ....................... | G10L 15/32 |
| 2018/0204567 A1* | 7/2018 | Church | ................... | G10L 15/26 |
| 2018/0374486 A1* | 12/2018 | Zhao | ....................... | G10L 15/16 |
| 2020/0335100 A1* | 10/2020 | Saon | ....................... | G10L 15/07 |

(Continued)

OTHER PUBLICATIONS

Y. He, J. Tang, H. Ouyang, C. Kang, D. Yin, and Y. Chang, "Learning to rewrite queries," in Proceedings of the 25th ACM International on Conference on Information and Knowledge Management, pp. 1443-1452, 2016.

(Continued)

*Primary Examiner* — Daniel C Washburn
*Assistant Examiner* — Athar N Pasha
(74) *Attorney, Agent, or Firm* — Pierce Atwood LLP

(57) ABSTRACT

A system is provided for handling errors during automatic speech recognition by leveraging past inputs spoken by the user. The system may process a user input to determine an ASR hypothesis. The system may then determine an alternate representation of the user input based on the inputs provided by the user in the past, and whether the ASR hypothesis sufficiently matches one of the past inputs.

18 Claims, 15 Drawing Sheets

(56) References Cited

U.S. PATENT DOCUMENTS

2021/0065702 A1* 3/2021 Fink .................. G06N 3/08

OTHER PUBLICATIONS

S. Riezler, Y. Liu, "Query rewriting using monolingual statistical machine translation," Computational Linguistics, vol. 36, No. 3, pp. 569-582, 2010.

J. Wang, J. Z. Huang, D. Wu, "Recommending High Utility Queries via Query-Reformulation Graph", Mathematical Problems in Engineering, vol. 2015, Article ID 956468, 14 pages, 2015.

* cited by examiner

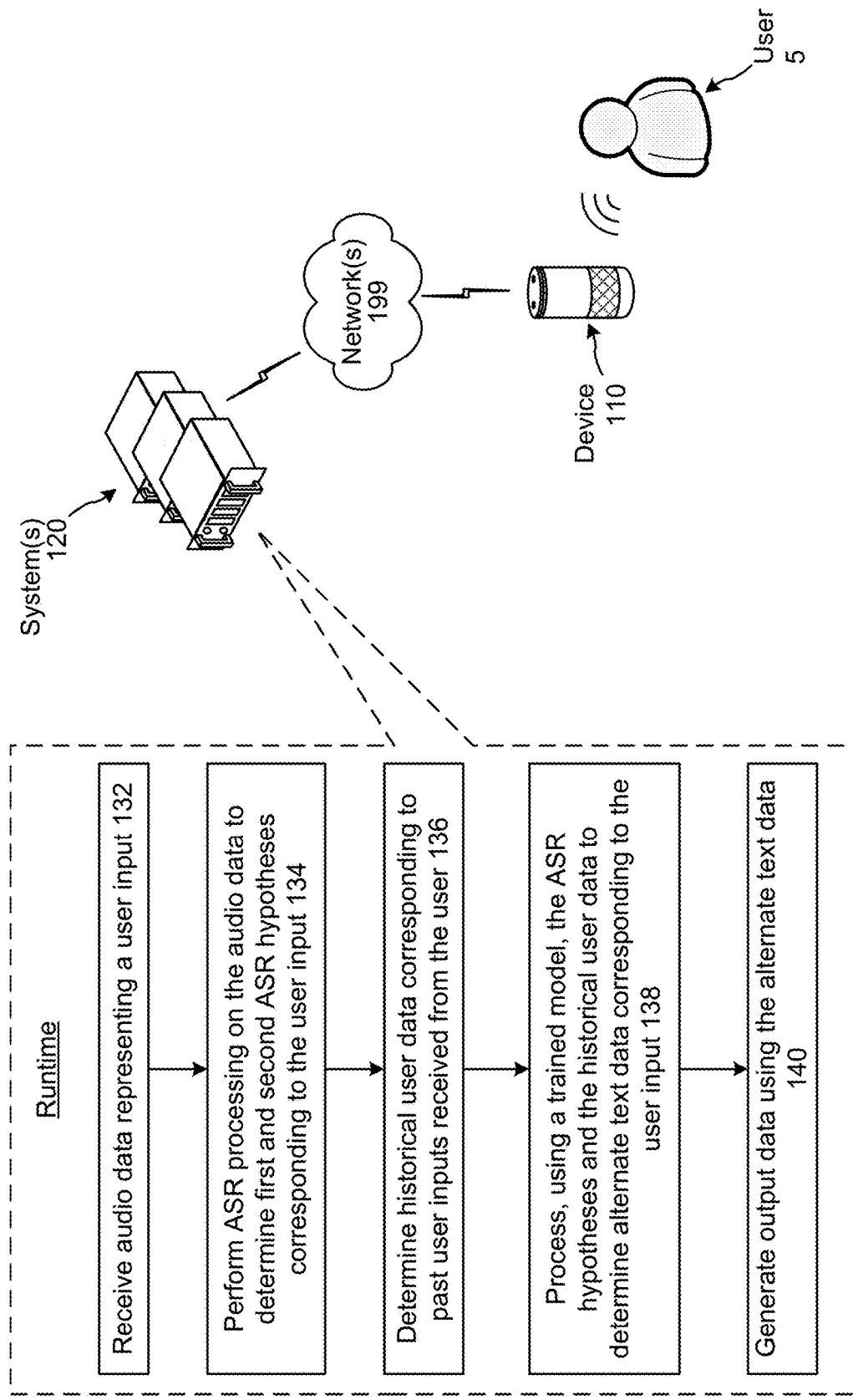

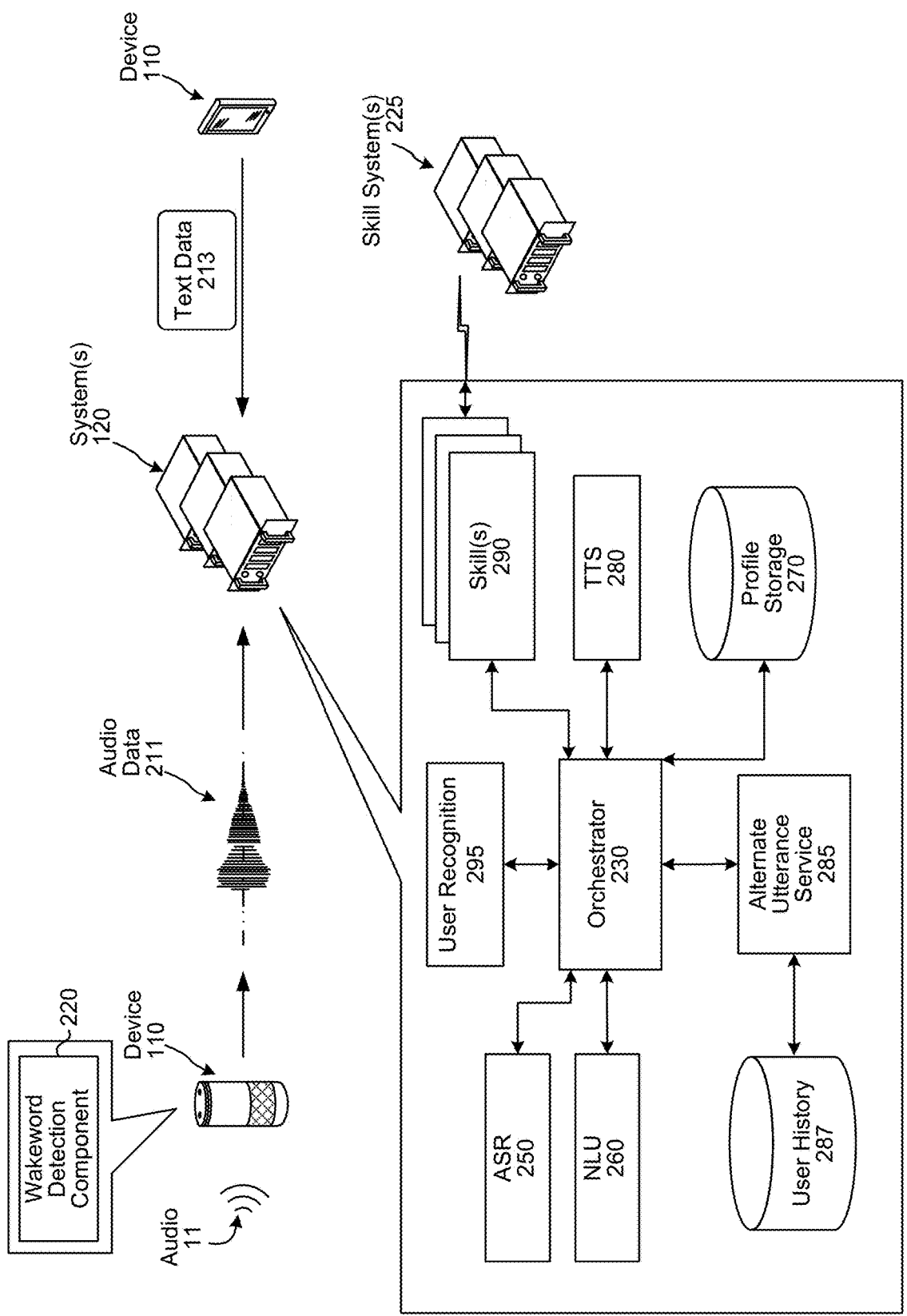

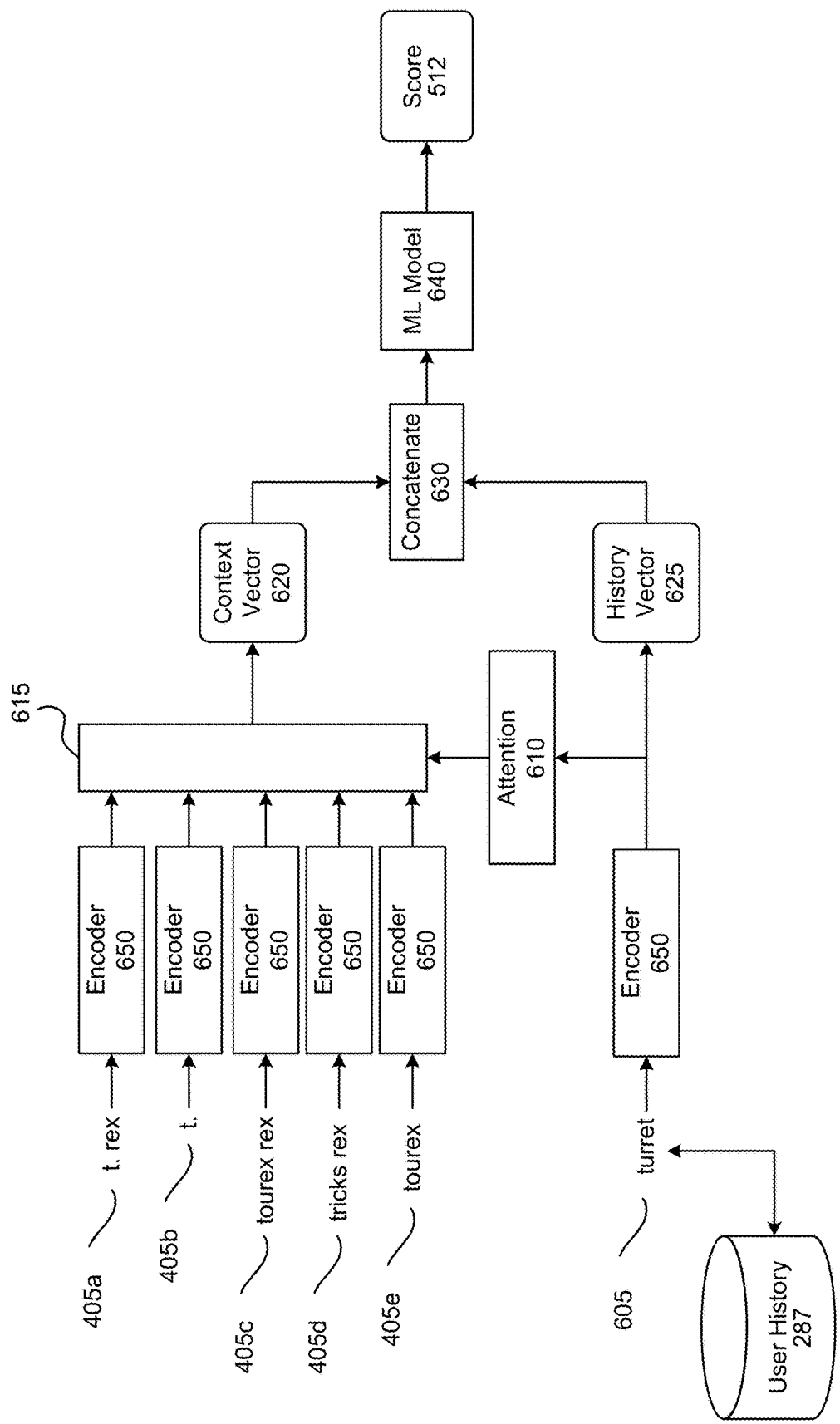

PERSONALIZED ALTERNATE UTTERANCE GENERATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to determine a likelihood of success for a user input using a trained model and provide an alternate utterance using historical data according to embodiments of the present disclosure.

FIG. 2A is a conceptual diagram of components of a system according to embodiments of the present disclosure.

FIG. 6 conceptually illustrates how an alternate utterance service may determine an alternate utterance according to embodiments of the present disclosure.

DETAILED DESCRIPTION

Figure 2B:
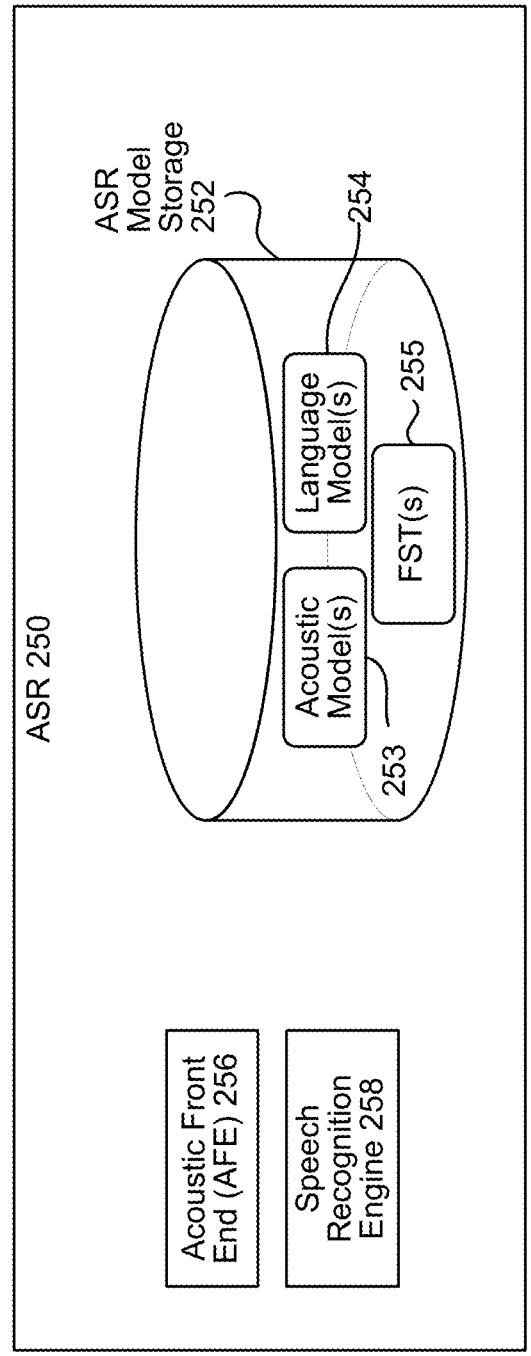
FIG. 2B is a conceptual diagram of automatic speech recognition components according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input as speech. For example, a user may speak an input to a device. The device may send audio data, representing the spoken input, to the system. The system may perform ASR processing on the audio data to generate text data representing the user input. The system may perform NLU processing on the text data to determine an intent of the user input as well as portions of the text data that may be used to perform an action responsive to the user input.

One potential error in a speech processing system occurs due to an error in ASR processing, which may be propagated into downstream components such as the NLU. This may result in an undesirable experience for a user, especially when the user had provided the same user input in the past and the system had responded successfully in the past. For example, a user may say "play my media playlist," and in the past the system responded successfully by performing the action, however, in the instant case due to a speech processing error the system may respond "I don't understand" or may not respond at all.

The present system may reduce speech processing errors by leveraging past inputs spoken by the user that resulted in the system responding successfully. For example, a user may say "turn on the lights" every time he or she enters the home. But in one instance, the speech processing system may understand the input as "turn onto flights" (due to background noise or other factors). This may cause the system to fail to identify or otherwise "understand" what the user is referring to. Using techniques described herein, the system may process this type of user input in view of the past inputs from the user to determine that the user meant "turn on the lights," and respond by performing the appropriate action.

As such, systems leveraging the teachings herein may provide a more desirable user experience. This is due, at least in part, to the fact that the present disclosure's teachings may result in a decrease in frequency at which unresponsive actions are performed by a system. By decreasing the instances of such actions being performed, user/system interactions may be improved.

FIG. 1 illustrates a system configured to determine a likelihood of success for a user input using a trained model and provide an alternate utterance according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1, the system may include device 110 local to a user 5, in communication with one or more systems 120 across one or more networks 199. The operations illustrated in FIG. 1 may be performed during runtime operations.

The system(s) 120 receives (132) audio data representing a user input. The audio data may include a user input/utterance spoken by the user 5 and captured by the device 110. The system(s) 120 performs (134) automatic speech recognition (ASR) using the audio data to determine at least a first ASR hypothesis and a second ASR hypothesis corresponding to the user input. As described below in relation to FIGS. 2A and 2B, the system(s) 120 may determine an ASR N-best list including multiple ASR hypotheses and corresponding scores representing what the user may have said. The first ASR hypothesis may include first text data corresponding to the user input and the second ASR hypothesis may include second text data corresponding to the user input.

The system(s) 120 determines historical user data corresponding to past user inputs received from the user 5. The historical user data may be determined using user profile data associated with the user 5. The system(s) 120 may retrieve data related to user inputs provided by the user 5 in the past (e.g., historical user inputs/historical utterances). The data may include text data representing the past user input, and may also include an indication of whether the past user input was successfully processed by the system(s) 120 (e.g., resulted in the response/action intended by the user). If the past user input was successfully processed, then the system(s) 120 may use the corresponding text data as the historical user data. In some embodiments, the system(s) 120 may also determine frequency data corresponding to the past user input, where the frequency data may indicate how often the user 5 provided the past user input during a given time period (e.g., over the past month, over the past week). The system(s) 120 may include the frequency data in the historical user data for further processing. The historical user data may relate to multiple user inputs provided by the user 5 in the past. Details of how the historical user data is determined (e.g., user history data 287) are described in relation to FIG. 5A.

The system(s) 120 processes (138), using a trained model, the ASR hypotheses and the historical user data to determine alternate text data (e.g., third text data) corresponding to the user input. The third text data may be an alternate representation of the user input. The system(s) 120 may also process other data relating to or generating during ASR processing, such as phoneme data, ASR confidence scores, ASR N-best list ranking, etc. to determine the alternate text data. The trained model may be configured to determine if one or more of the ASR hypotheses are substantially similar to a past user input provided by the user 5. In some cases, the ASR hypotheses corresponding to the user input may cause an error during further processing (e.g., NLU processing error, generation of a response/output that was not intended by the user, etc.). To avoid such errors, the system(s) 120 may determine if the user input is similar to one of the past user inputs. For such a determination, the system(s) 120 may consider how frequently the past user input was provided by the user 5. Using the trained model, the system(s) 120 may determine a likelihood of the user input being similar to a past user input, and if the likelihood meets a threshold, then the system(s) 120 may determine to rewrite/rephrase the user input using the text data corresponding to the past user input (rather than using the best ASR hypothesis). The trained model may output a score indicating whether the utterance should be rewritten or not. For example, if the system(s) 120 determines that the user input can be successfully processed (without ASR, NLU or other types of errors), and the historical user data does not indicate a past user input that is similar to the instant user input, then the system(s) 120 may determine to not rewrite the user input. In other words, the user input may be one that the user does not provide often or is providing for the first time.

The trained model may also be configured to process ASR scores associated with the ASR hypotheses, phonetics or other data related to the ASR hypothesis or determined during ASR processing (as described in relation to FIGS. 2A and 2B). In some embodiments, the system(s) 120 may perform operation 138 if the system(s) 120 determines there is uncertainty in the ASR processing based on the ASR scores of the hypotheses being below a threshold or indicating that the system is uncertain as to what the user said.

In an example embodiment, the trained model may be used as described in relation to FIG. 6. In another example embodiment, the trained model may be used as described in relation to FIG. 7.

The system(s) 120 generates (140) output data using the third text data. For example, the system(s) 120 may perform NLU processing (as described below in relation to FIG. 2A) on the third text data to determine the appropriate action/response to the user input. In an example embodiment, the system(s) 120 may send the third text data and the first/best ASR hypothesis for NLU processing, and determine, based on the results of NLU processing, whether to generate output data using the third text data or the best ASR hypothesis. Details on how the output data is generated are described in relation to FIG. 5B.

In some cases, the output of the trained model may indicate that the user input is not similar to a past user input, and the system(s) 120 may generate output data using the first/best ASR hypothesis.

In some embodiments, the system(s) 120 may consider how recently a past user input was provided by the user 5 in determining whether the instant user input is similar to the past user input. The system(s) 120 may include a timestamp indicating when the past user input was most recently received by the system(s) 120, and the trained model may be configured to process this information. For example, if the past user input was "turn on the oven" then it may be more likely that the instant user input is also referring to the oven, for example, "turn off the oven" or "set the temperature of the oven."

In some embodiments, the system(s) 120 may also consider other data relating to the user 5. For example, the system(s) 120 may determine, using user profile data, the devices and appliances that the user 5 has registered to use with the system. For example, the user 5 may have registered an appliance/device "bedroom light" but the ASR hypothesis corresponding to the user input is "bathroom light." The trained model may be configured to determine that the user 5 does not have an appliance/device called "bathroom light,"

and based on the past user inputs being "bedroom light" it is more likely that the instant user input is "bedroom light." If the system(s) 120 had continued with "bathroom light" then it may produce an error since the system would be unable to determine and operate the device/appliance that corresponds to "bathroom light."

Potential speech processing errors may include poor quality audio data, distortion due to background noise, ambiguous entity data, slot recognition/classification errors, intent recognition/classification errors, skill processing errors, user errors (e.g., when a user provides a user input in an incorrect manner or syntax, a user input includes a slip of tongue, mispronunciation, etc.), a null-response (e.g., the system is unable to determine what the user said, the system is unable to find a response to the user's intent), and the like.

The system may operate using various components as illustrated in FIG. 2A. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the server(s) 120. Upon receipt by the server(s) 120, the text data 213 may be sent to the orchestrator component 230, which may send the text data 213 to the NLU component 260.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250, e.g., the alternate utterance service 285) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

The system(s) 120 may also include the alternate utterance service 285. The alternate utterance service 285 may analyze the ASR N-best list hypotheses and the instant user's past utterances stored in user history data storage 287 to determine a rewrite or alternate utterance for further processing. In some embodiments, the alternate utterance service 285 may compare the past utterances spoken by the user to the ASR N-best list corresponding to the user input and determine if any of the hypotheses on the ASR N-best list match one of the past utterances. If there is a match, then the alternate utterance service 285 may select the matched past utterance as the alternate utterance. The alternate utterance service 285 may determine a match on an utterance-level or on an entity-level. For example, the alternate utterance service 285 may determine a match exists if the user input matches a past utterance (utterance-level match), or if an entity name in the user input matches an entity name in the past utterance (entity-level match).

Details on how the user history data 287 is determined are described in connection with FIG. 5A. In some embodiments, the user history data 287 may be part of or stored within the profile storage 270.

In another embodiment, the alternate utterance service 285 may employ a neural network trained model to determine an alternate utterance. Details of this embodiment are described below in connection with FIG. 6.

In another embodiment, the alternate utterance service 285 may employ an encoder-decoder system to determine an alternate utterance. Details of this embodiment are described below in connection with FIG. 7.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
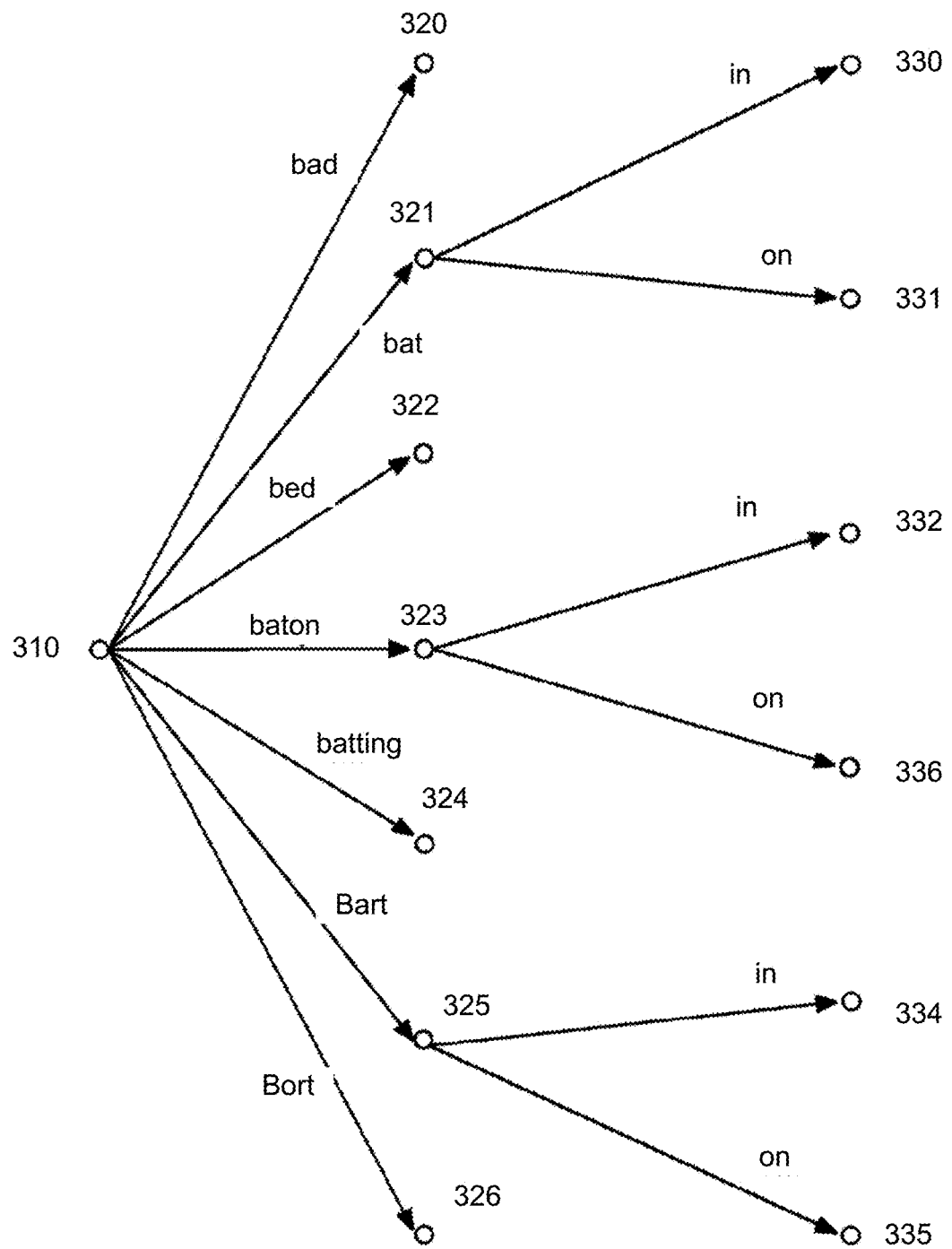
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", ""batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR component 250, e.g., the alternate utterance service 285) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Figure 4:
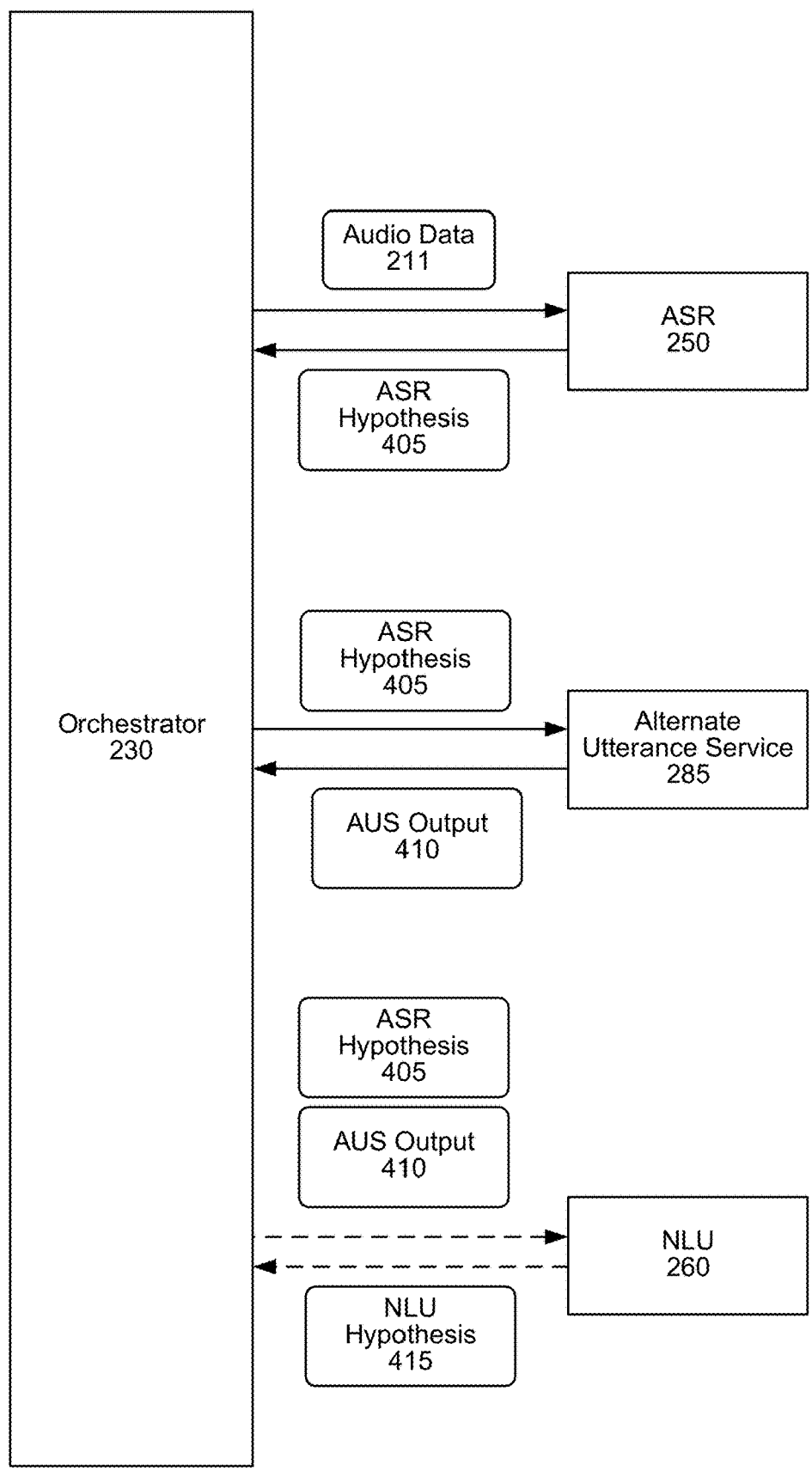
FIG. 4 is a conceptual diagram illustrating how user inputs may be processed at runtime using an alternate utterance service according to embodiments of the present disclosure.

FIG. 4 conceptually illustrates how user inputs may be processed during runtime using the alternate utterance service component 285 according to embodiments of the present disclosure. If a user input is received as audio 11 (e.g., is a spoken user input), the orchestrator component 230 may send audio data 211, representing the audio 11, to the ASR component 250. The ASR component 250 may transcribe the audio data 211 into an ASR hypothesis(es) 405, which the ASR component 250 may send to the orchestrator component 230.

The orchestrator component 230 may send the ASR hypothesis(es) 405 to the alternate utterance service 285. The alternate utterance service 285 may process the ASR hypothesis(es) 405 to determine whether one or more of the ASR hypothesis(es) 405 should be rephrased.

The alternate utterance service 285 may implement a trained model (generated by the model building component 810) to determine whether the present user input should be rephrased. For example, the alternate utterance service 285 may process an ASR hypothesis and user history data to determine whether the ASR hypothesis is similar to previous inputs from the user that resulted in the system responding successfully.

The alternate utterance service 285 generates alternate utterance service (AUS) output data 410. The AUS output data 410 may be text data representing an alternate representation (an alternate ASR hypothesis) of the user input represented by ASR hypothesis(es) 405. In some embodiments, the alternate utterance service 285 may output an alternate representation of the user input if it is determined that the system is uncertain about what the user said. For example, the alternate utterance service 285 may determine, using the scores associated with the ASR hypotheses, that the system lacks a level of confidence in its ASR processing. The score associated with the best ASR hypothesis and the score associated with the second best ASR hypothesis may be below a threshold confidence level. Alternatively, the score associated with the best ASR hypothesis and the score associated with the second best ASR hypothesis may be within a threshold range indicating that the system is unsure whether the user input corresponds to the best ASR hypothesis or the second best ASR hypothesis.

The alternate utterance service 285 may output an alternate representation of the user input that matches one of the utterances spoken by the user in the past. The alternate utterance service 285 may consider how often/frequently the past utterance was spoken by the user in determining whether the past utterance should be used to generate the alternate representation. The alternate utterance service 285 may also consider how recently the past utterance was spoken by the user in determining whether the past utterance should be used to generate the alternate representation.

The AUS output data 410 may be text data representing one or more of the ASR hypotheses 405. The alternate utterance service 285 may output one or more ASR hypotheses 405 as the AUS output data 410 if the past utterances spoken by the user do not sufficiently match the ASR hypothesis(es) 405, indicating that the user input may not have been spoken by the user before.

In some embodiments, the orchestrator 230 may send the AUS output data 410 (in the form of an ASR hypothesis/ alternate ASR output data) to the NLU component 260 to determine the corresponding intent data and corresponding slot data. The AUS output data 410 may include an alternate representation of the user input or the ASR hypothesis 405 (e.g., the best ASR hypothesis). If the AUS output data 410 includes an alternate representation of the user input, the orchestrator 230 may also send the best ASR hypothesis 405 to the NLU component 260, and the NLU component 260 may process each one to determine a N-best list of NLU hypotheses. The NLU hypotheses may be processed by a ranker component to determine a NLU hypothesis 415 that best represents the intent and slot data corresponding to the user input represented in audio data 211. The orchestrator 230 may send the NLU hypothesis 415 to an appropriate skill(s) 290 for processing and executing a corresponding action. The NLU hypothesis 415 may correspond to the best ASR hypothesis 405 or to the alternate representation generated by the alternate utterance service 285.

In some embodiments, the AUS output data 410 may include one or more of the ASR hypotheses 405 generated by the ASR component 250 and one or more alternate representations/ASR hypotheses determined by the trained model implemented by the alternate utterance service 285. The NLU component 260 may process the original ASR hypothesis(es) and the alternate ASR hypothesis(es) to determine a N-best list of NLU hypotheses, and select one NLU hypothesis for further processing. Thus, the NLU component 260 may select the best NLU output data for further processing based on comparing NLU output data corresponding to the original ASR output data and the alternate ASR output data. In this manner, the system(s) 120 is configured to consider the original ASR output data and the alternate ASR output data during NLU processing, rather than just considering the alternate ASR output data.

When a user input is received by a device 110, the device 110 may generate a user input identifier corresponding to the user input. The system may maintain a record of processing performed with respect to the user input using the user input identifier. For example, the audio data 211 may be associated with the user input identifier when the orchestrator component 230 sends the audio data 211 to the ASR component 250; the ASR hypothesis 405 may be associated with the user input identifier when the ASR component 250 sends the ASR hypothesis 405 to the orchestrator component 230; the ASR hypothesis 405 may be associated with the user input identifier when the orchestrator component 230 sends the ASR hypothesis 405 to the alternate utterance service 285; the AUS output data 410 may be associated with the user input identifier when the alternate utterance service 285 sends the AUS output data 410 to the orchestrator component 230; the AUS output data 410 may be associated with the user input identifier when the orchestrator component 230 sends the AUS output data 410 to the NLU component 260; the AUS output data 410 may be associated with the user input identifier when the orchestrator component 230 sends the AUS output data 410 to the skill(s) 290; etc.

As described above, the alternate utterance service 285 may receive an ASR hypothesis 405 when the user input is a spoken user input. One skilled in the art will appreciate that the alternate utterance service 285 may receive text data (representing a text based user input) and may process as described above with the text based user input without departing from the present disclosure.

Figure 5A:
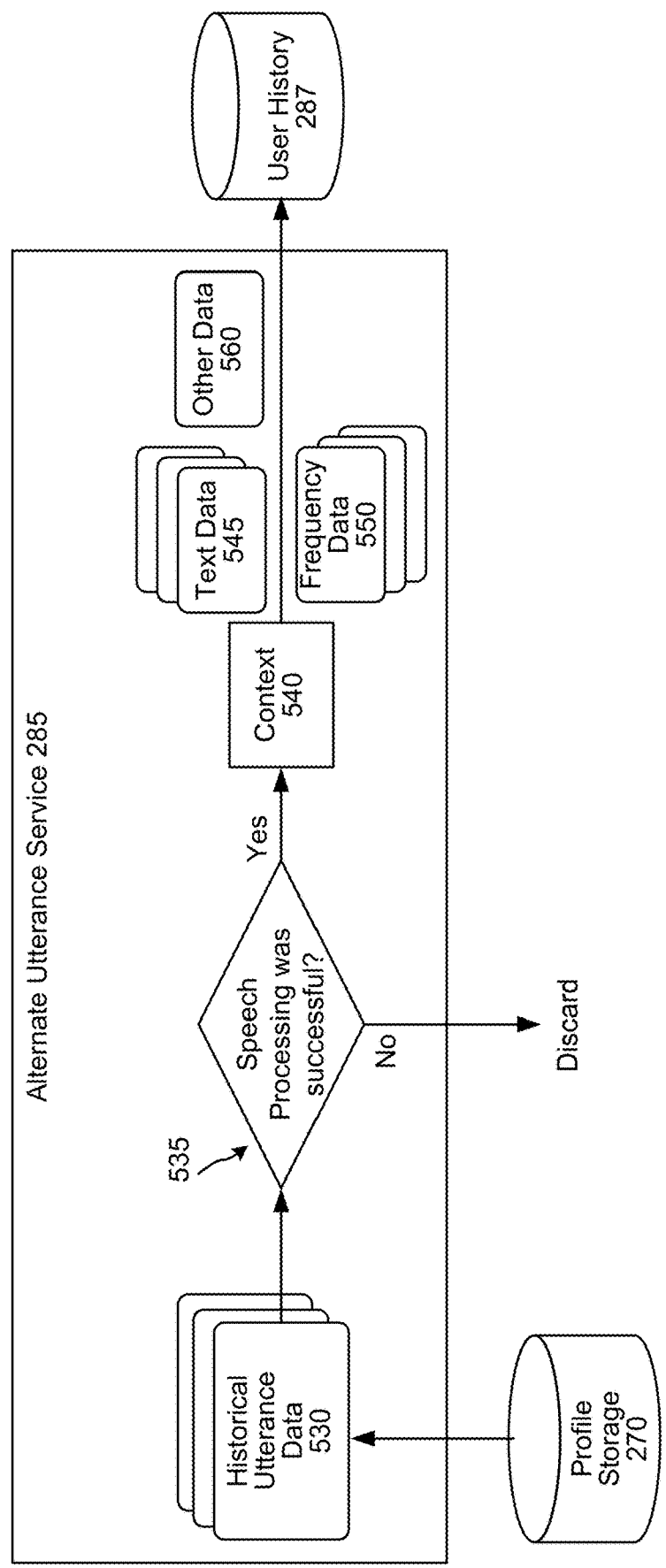
FIG. 5A is a conceptual diagram of alternate utterance service components to generate user history data according to embodiments of the present disclosure.

FIG. 5A is a conceptual diagram of alternate utterance service components to generate user history data according to embodiments of the present disclosure. The alternate utterance service component 285 may determine user history data 287 associated with a particular user that can be used to generate alternate representations of the user input from the particular user. The alternate utterance service component 285 retrieves historical utterance data 530 from the profile storage 270 associated with a user. The alternate utterance service component 285 may use data determined by the user recognition component 295 to determine a user profile associated with the particular user, and retrieve data associated with the determined user profile from the user profile storage 270. In this manner, the alternate utterance service component 285 processes data related to a particular user to determine the user history data 287 associated with the particular user.

The profile storage 270 may store historical utterance data 530 related to inputs (spoken or other) provided by the user and received and processed by the system(s) 120. The profile storage 270 may store data related to inputs provided by the user in the past. Such data 530 may include text data representing the input and as determined by the ASR component 250. The data 530 may also include an indication whether the user input was successfully processed (e.g., resulted in an output or response from the system that was expected by the user, no errors in speech processing were encountered, etc.) or an indication of an error occurring in processing the user input. In some embodiments, the historical utterance data 530 may also include contextual information related to the user input, such as, the time the user input was provided, device identifier for the device 110 that received the user input, location of the device 110 that received the user input, and the like.

The alternate utterance service component 285 may further process the historical utterance data 530 related to individual user inputs to determine the user history data 287. The alternate utterance service component 285 determines (535) whether a user input was successfully processed using indication data included in the historical utterance data 530. If the user input was not successfully processed, then the alternate utterance service component 285 may discard the historical utterance data related to the user input and not use it to determine the user history data 287. If the user input was successfully processed, the alternate utterance service component 285 continues further processing of the historical utterance data 530.

The alternate utterance service component 285 may include a context component 540 which is configured to determine how often the user provided a particular user input. The context component 540 may also determine how often the user provided the particular user input to the system(s) 120 within a given time period (e.g., in the past month, in the past week, etc.) The context component 540 is also configured to determine text data representing the user input. The context component 540 may also determine other data related to the past user inputs that may help in determining whether the input should be rewritten or not.

The context component 540 may determine the frequency of receiving the user input by the system(s) 120 using the profile storage data 270 and the historical utterance data 530 to determine how many times the user provided the particular user input. The context component 540 outputs frequency data 550 indicating how often a user input was provided by the user. The frequency data 550 may be a numerical value indicating the number of times the user input was provided in a given time period. For example, the frequency data 550 may be 30, indicating that the user provided the user input 30 times in the past month. Alternatively, the frequency data 550 may be a percentage indicating how often the user input was provided compared to other inputs. For example, the frequency data 550 may be 30% or 0.30, indicating that 30 percent of the total inputs provided by the user in the past month was this particular input. The frequency data may be a histogram representing on a daily basis or a daily usage of the system by the user and the user inputs provided. The frequency data 550 may be binned frequencies rather than a frequency count, such as, high frequency, medium frequency, low frequency, etc. In some embodiments, the context component 540 may determine how recently a user input was provided, for example, by using a timestamp associated with the past user input.

The context component 540 may determine other data 560 relating to the historical utterance data 530, such as the device type that received the past user input, the device id that received the past user input, the time when the past user input was received, device location that received the past user input, and the like. The other data 560 may include data representing how the user provides a particular user input frequently. For example, the user may provide the user input "turn on bedroom lights" to a device 110 located in the user's bedroom, more often than not in the night. The other data 560 may indicate such information relating to the past user input of "turn on bedroom lights."

The context component 540 also outputs text data 545 representing the user input. The context component 540 may determine the text data 545 using the historical utterance data 530, which includes the text data representing the user input (that may be determined by the ASR component 250). The alternate utterance service component 285 stores the text data 545 corresponding to an individual user input in the user history 287, and associates the frequency data 550 indicating the number of times the user input was provided with the instance of text data 545 corresponding to the user input. The alternate utterance service component 285 uses the user history data 287 to determine whether a user input should be rewritten or rephrased for successful speech processing, as described further in relation to FIG. 5B.

In some embodiment, the system(s) 120 may also include an ASR uncertainty component. The ASR uncertainty component may determine that an ASR uncertainty exists when the ASR component 250 is unable to generate text data corresponding to the utterance represented in the audio data 211 with a certain level of confidence. Details of how the ASR component 250 generates text data are described above in connection with FIG. 2B. In particular, the ASR component 250 outputs an N-best list of hypotheses. The N-best list includes a ranked listing of hypotheses of what the utterance may be. The ASR component 250 may assign a score to each hypothesis, where the score may indicate a confidence level. The ASR component 250 selects the hypothesis with the highest score (that may be above a threshold) as the output text data corresponding to the user input/utterance. In some cases, none of the scores of the N-best hypotheses may be above a threshold. In other words, the ASR component 250 may be unable to confidently select a hypothesis for the text data corresponding to the utterance. This may be because of the quality of the audio data (for example, due to a noisy environment), traits of the speaker (such as accent), use of uncommon words or proper nouns, and the like. In such cases, the ASR uncertainty component may determine that an ASR uncertainty exists and may determine to execute or invoke the alternate utterance service component 285, rather than causing friction in the user experience. In an example embodiment, the ASR uncertainty component may analyze the N-best list and the respective scores to determine that the ASR component 250 is likely to output an error, and may determine to invoke the alternate utterance service component 285. In some embodiments, the ASR uncertainty component may determine that an ASR uncertainty exists when the score corresponding to the highest ranked (best) ASR hypothesis is within a threshold range of the score corresponding to the next highest ranked (second best) ASR hypothesis (e.g., the scores for the top two ASR hypotheses are too similar or too close to each other indicating that the system is uncertain whether the user input corresponds to the first ASR hypothesis or the second ASR hypothesis). The system may determine a value representing the difference between the best ASR score (e.g., first score) and the second best ASR score (e.g., a second score), determine if the value satisfies a condition or meets a threshold value, and determine that an ASR uncertainty exists based on the value satisfying the condition or meeting the threshold value.

Figure 5B:
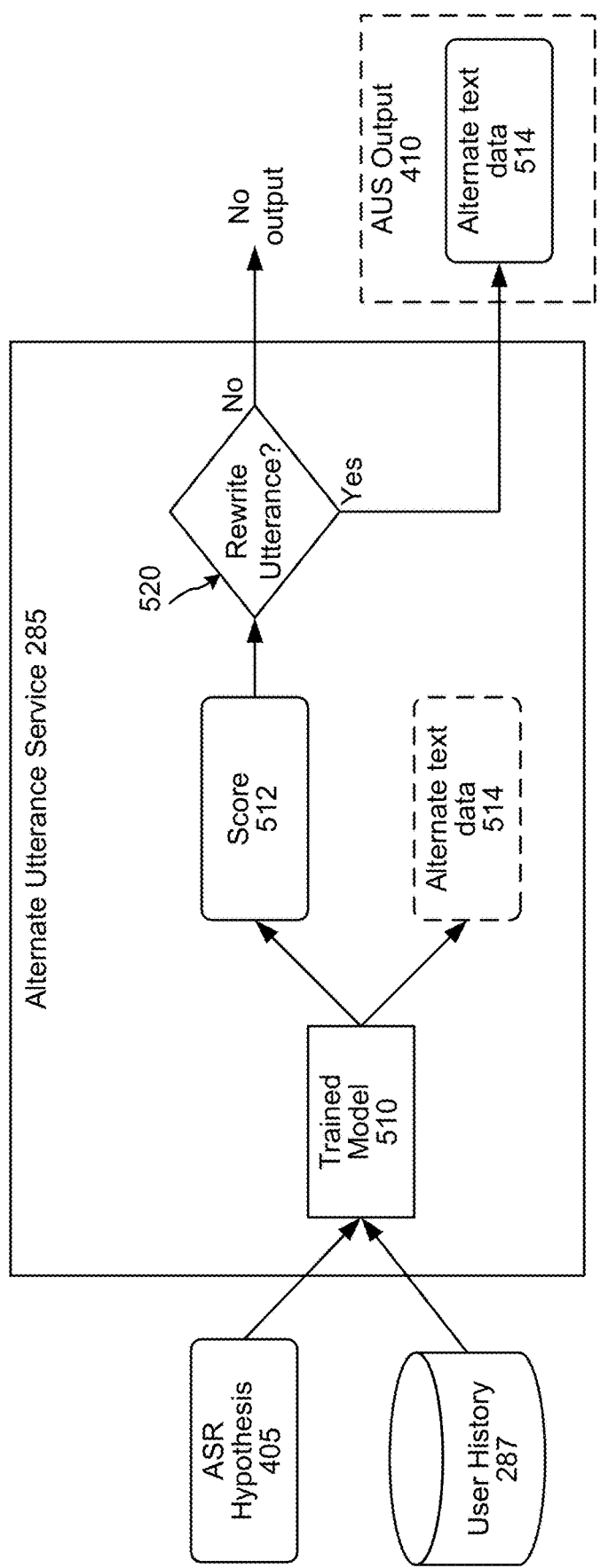
FIG. 5B is a conceptual diagram of alternate utterance service components to generate an alternate utterance according to embodiments of the present disclosure.

FIG. 5B is a conceptual diagram of the alternate utterance service component according to embodiments of the present disclosure. The alternate utterance service component 285 includes a trained model 510. In some embodiments, the trained model 510 may be used as described in connection with FIG. 6. In other embodiments, the trained model 510 may be used as described in connection with FIG. 7. The trained model 510 may be generated as described in connection with FIG. 8. The alternate utterance service component 285 receives an ASR hypothesis 405 from the orchestrator 230 or from the ASR component 250. The ASR hypothesis 405 is text data representing a user input/utterance. The ASR hypothesis 405 may be the ASR N-best list generated by the ASR component 250 corresponding to the user input/utterance, in which case data 405 may include more than one ASR hypothesis, ASR scores corresponding to each ASR hypothesis, and/or a ranking of the ASR hypotheses on the N-best list.

The trained model 510 processes the ASR hypothesis 405 and the user history data 287 to output a score indicating whether the ASR hypothesis(es) 405 is substantially similar to or matches a past user input. Details on how the user history data 287 is determined are described in connection with FIG. 5A. The trained model 510 may be trained to consider past inputs provided by the user, including the frequency of the inputs, to determine a likelihood (which may be indicated by the score 512) that the instant user input is the same as or similar to the past user input (especially when the system is uncertain of what the instant user input is).

In some embodiments, the trained model 510 may also output alternate text data 514, which may be an alternate representation of the user input. In some cases, the alternate text data 514 may be the text data representing the past user input if it is similar to or matches one of the ASR hypotheses.

The alternate utterance service component 285 determines (520) whether the textual representation of the user input/utterance should be rewritten based on the score 512. The alternate utterance service component 285 may determine to rewrite the user input if the score 512 meets a threshold indicating that the user input is substantially similar to or matches a past user input. If the alternate utterance service component 285 determines to rewrite the user input, then the AUS output data 410 generated by the alternate utterance service component 285 includes the alternate text data 514 determined by the trained model 510. If the alternate utterance service component 285 determines not to rewrite the user input, then the alternate utterance service 285 may not generate an output.

In some embodiments, the alternate utterance service component 285 may be use contextual information related to the user input and the past user inputs to determine a likelihood of the ASR hypotheses being similar to or matching a past user input. For example, the alternate utterance service component 285 may consider a general time (e.g., morning, afternoon, evening, on Tuesdays, etc.) or a specific time (e.g., every time the user enters the home, 6 pm every day, when another user enters the home, etc.) when the past user input/utterance is provided by the user, and compare it to the time that the instant user input is received to determine the likelihood of the instant user input matching the past user input. For example, in the past week every morning the user may have said "play music," and the instant user input was received in the morning and is similar to the ASR hypothesis corresponding to the instant user input, making it more likely that the instant user input is "play music." Other contextual information related to the past user inputs and the instant user input that the alternate utterance service component 285 may consider includes, but is not limited to, device identifier receiving/capturing the user input, location of the device receiving the user input, location of the user when providing the input, and outer user profile data.

In this manner, the alternate utterance service component 285 determines when a present user input is similar to or matches a past user input by processing the ASR hypotheses corresponding to the present user input with respect to the past user inputs provided by the user. In cases where ASR processing is unable to determine, with a certain level of confidence, what the user said, the alternate utterance service component 285 determines that the user likely said one of the utterances he or she had said in the past (based on the past utterance's similarity to the ASR hypotheses and based on how often the past utterance was spoken by the user). Thus, the present system is able to reduce speech processing errors by considering utterances spoken by the user in the past and determining that the user likely said what he or she said in the past.

FIG. 6 conceptually illustrates how an alternate utterance service may determine an alternate utterance according to embodiments of the present disclosure. The alternate utterance service component 285 may employ the trained model 510 to determine if the user input should be rewritten using a past user input. FIG. 6 illustrates various components of an example trained model 510. In this embodiment, the alternate utterance service component 285 may process each ASR hypothesis of the N-best list using an encoder to determine encoded feature vectors representing the ASR hypotheses corresponding to the instant user input. The alternate utterance service component 285 may also encode a past user input (retrieved from the user history data storage 287) to determine an encoded feature vector representing a historic input provided by the user. The alternate utterance service component 285 may process the encoded feature vectors representing the ASR hypotheses to determine an average feature vector, while using an attention mechanism with the historic input encoded feature vector to attract "attention" to certain features of the past user input when determining another feature vector (a context feature vector). The context feature vector may be concatenated with the encoded feature vector representing the historic input, and the concatenated feature vector may be processed using a machine-learning (ML) model (e.g., trained model 640). In an example embodiment, the ML model 640 may be a neural network model, such as a DNN. The output of the ML model may be a score indicating a likelihood of whether the user input is substantially similar to or matches the past user input. The alternate utterance service component 285 may perform these operations with another past user input retrieved from the user history data storage 287 to determine if the user input is substantially similar to another past user input.

In some embodiments, the alternate utterance service component 285 may process the ASR hypothesis corresponding to the entire user input/utterance. In other embodiments, the alternate utterance service component 285 may process a portion of the ASR hypothesis, for example, the portion that corresponds to an entity name or slot value that may be used by the NLU component 260 to determine the appropriate action/response from the system.

As shown, the alternate utterance service component 285 may process each of the ASR hypotheses 405a-405e of the ASR N-best list. Each of the ASR hypotheses 405 may be processed using an encoder, for example encoder 650 (further details of encoder 650 are described in relation to FIG. 9). The output of the encoder 650 may be a feature vector or a word embedding. A past user input 605 retrieved from the user history data storage 287 may be processed using the encoder 650 to determine a corresponding history feature vector 625 or word embedding. The feature vectors corresponding to the ASR hypotheses may be processed to determine (615) an average feature vector. The average feature vector may be determined by summing the feature values and dividing the sum by the number of vectors. In some embodiments, the average feature vector may be a weighted average of the feature vectors corresponding to the ASR hypotheses, where the average is weighted based on the ASR score or ranking corresponding to the ASR hypothesis. The feature vector corresponding to the past user input may be processed using an attention model 610 and the output of the attention model 610 may be used to attract attention to the past user input with respect to the ASR hypotheses when determining the context feature vector 620. A concatenation component 630 may be used to concatenate the context feature vector 620 with the history feature vector 625. The concatenated feature vector may be processed using the ML model 640 to determine the score 512. The score 512 may indicate whether the instant user input is substantially similar to the past user input. If the score 512 meets a threshold, the alternate utterance service component 285 may output an alternate text representation of the instant user input using the text representation of the past user input (which is known to have been successfully processed by the speech processing system).

Figure 7:
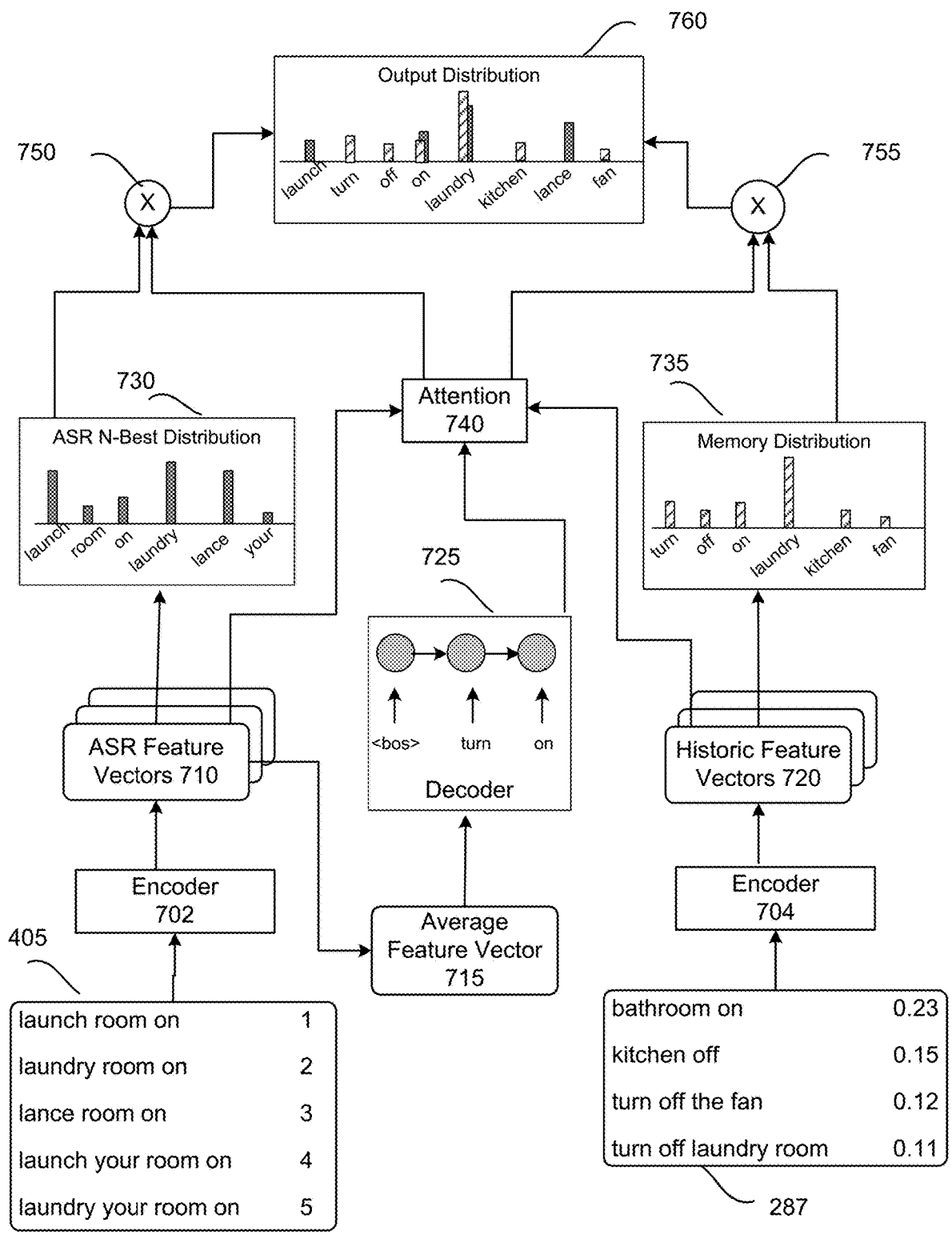
FIG. 7 conceptually illustrates another way an alternate utterance service may determine an alternate utterance according to embodiments of the present disclosure.

FIG. 7 conceptually illustrates another way an alternate utterance service may determine an alternate utterance according to embodiments of the present disclosure. FIG. 7 illustrates a trained model 510 that is an encoder-decoder framework, such as a seq2seq model, including an encoder 650, a decoder 725, and an attention mechanism 740. An example trained model 510 may include the components illustrated in FIG. 7. The seq2seq model may be a pointer-generator model that points to the user history data 287 and the ASR N-best list 405, and retrieves words one by one from the user history data 287 and the ASR N-best list 405.

As shown in FIG. 7, the ASR N-best list 405 may be processed by the encoder 702 to determine ASR feature vectors 710 corresponding to the ASR hypotheses. An ASR feature vector 710 may include word embedding data (further described below) as output by the encoder 702. The ASR feature vectors 710 may also include other data corresponding to the user input that may be determined by the ASR component 250, such as phoneme data, ASR confidence scores, ASR N-best list ranking, and the like. Such other data may be processed by the encoder 702 to determine the ASR feature vectors 710. An average feature vector 715 is determined using the ASR feature vectors 710. The average feature vector 715 may be determined by summing the feature values and dividing the sum by the number of vectors. In some embodiments, the average feature vector may be a weighted average of the feature vectors corresponding to the ASR hypotheses, where the average is weighted based on the ASR score or ranking corresponding to the ASR hypothesis. The decoder 725 may process the average feature vector 715 to start the decoding process.

The user history data 287, which includes past user utterances/text data, may be processed using the encoder 704 to determine historic feature vectors 720. A historic feature vector 720 may include word embedding data (further described below) as output by the encoder 704. The historic feature vectors 720 may include other data corresponding to the user history data 287, such as frequency data indicating how often a user provides a particular input, ASR data associated with the past utterances (e.g., phoneme data, ASR confidence scores, ASR N-best ranking, etc.), and the like. The encoder 703 may process such other data to determine the historic feature vectors 720.

The attention mechanism 740 may be configured to attract attention in a hierarchical manner in a two-level attention scheme, one at the word-level and the other at the utterance-level. The attention mechanism 740 may be configured to attract attention to the features 710 corresponding to the ASR hypotheses 405 and the features 720 corresponding to the user history 287 (word-level attention), and/or the last word decoded by the decoder 725 (utterance-level attention).

Two word distributions may also be determined, one distribution 730 from the ASR N-best list 405 and another distribution 735 from the user history data 287. The word distributions 730 and 735 may be weighted at operation 750 and 755 respectively according to the output of the attention mechanism 740 on the overall context between the two distributions and combining them into an overall distribution 760. As shown in the FIG. 7, "laundry" has the highest score (distribution 760).

The model selects "laundry" as the next word in the sentence/utterance, and sends it back to the decoder to continue predicting the next word in the sentence/utterance until the end of the sentence/utterance is reached.

The seq2seq model of the present system may use hierarchical attention for the ASR N-best list and the user history data. The decoder output and the ASR N-best list may be concatenated into a vector. The seq2seq model may 'attend' on the vector using the user history data to bring attention to particular words represented in the ASR N-best list and the decoded output and bring attention to the particular words in the user history. The seq2seq model, using an attention model may determine how much emphasis to apply to words in the ASR N-best list and how much emphasis to apply to words from the user history data. The frequency of the past user input and the rank/scores of the ASR N-best list may be included with each word as an additional factor for the model to process. In some embodiments, the seq2seq model may include a 'rewriteability' task to predict whether the target is rewriteable or not. Rewriteable may be defined as whether the target input (an ASR hypothesis) is in the user history data or not. The not-rewriteable user inputs may be masked with respect to the cross-entropy loss, but may be used with respect to binary loss.

Figure 8:
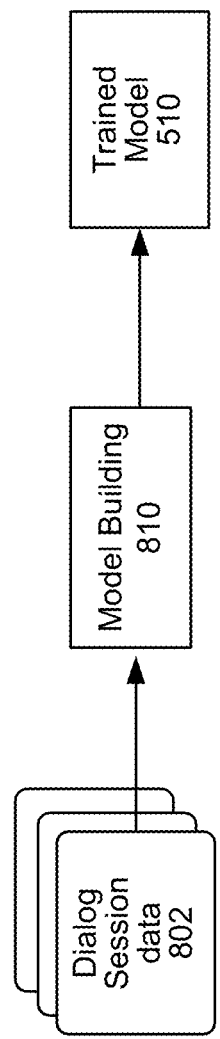
FIG. 8 is a conceptual diagram of building the trained model using training data according to embodiments of the present disclosure.

FIG. 8 conceptually illustrates components for training a machine learning model to determine likelihood of the instant user input being similar to or matching a past user input. The alternate utterance service 285 may include a model building component 810. Alternatively, the model building component 810 may be a separate component included in the system(s) 120.

The model building component 810 may train one or more machine learning models to determine if a user input will result in an error and when a user input should be rephrased. The model building component 810 may train the one or more machine learning models during offline operations. The model building component 810 may train the one or more machine learning models using a training dataset.

The training dataset used by the model building component 810 may include dialog session data 802 corresponding to user interactions with the device 110. As used herein, a "dialog session" may refer to a set of user inputs and corresponding system outputs while a user interacts with a device 110. When the system(s) 120 receives a user input, the system(s) 120 may associate the data (e.g., audio data or text data) representing the user input with a session identifier. The session identifier may be associated with various speech processing data (e.g., ASR hypothesis(es) corresponding to the user input, an indication that an error occurred during processing the user input, etc.). The output or action performed by the system(s) 120 in response to the user input may also be associated with the session identifier and be identified as part of the particular dialog session. The system(s) 120 may receive one or more additional/subsequent user inputs, after the system generates an output or performs an action in response to the initial user input. The additional user inputs may be identified as being part of the same dialog session and associated with the session identifier. The system(s) 120 may determine the additional user inputs are part of the same dialog session based on the time elapsed between the initial user input and the additional user input. The system(s) 120 may also determine that the additional user input is a successful rephrase of the initial user input from the user based on the system producing an error while processing the initial user input and the system processing the additional user input to produce an appropriate response. For example, an initial user input of "turn on the light" may be associated with a first session identifier. The system(s) 120 may process the user input and determine an error during speech processing, resulting in a system-generated audio output of "I am sorry, I do not understand" that is also associated with the first session identifier. The system(s) may subsequently receive the user input "turn on the lights," which is associated with the first session identifier based on the system(s) 120 receiving it within a predefined time period of the initial user input. The system(s) 120 may process the subsequent user input and respond accordingly by turning on the lights. In this case, the system(s) 120 may determine that the additional user input ("turn on the lights") is a successful rephrase of the initial user input ("turn on the light"). Thus, the dialog session data 802 may include utterance pair data representing user inputs (initial utterance and rephrase utterance). The dialog session data 802 may also include an indication of that the initial utterance resulted in an error and the rephrase utterance was successful.

The training dataset may include multiple utterance pairs, where each pair includes an initial user input that resulted in an error and a subsequent user input that resulted in successful processing (a successful rephrase). The training dataset may include text data representing the utterance pairs. The utterance pairs may be associated with multiple different users (and not just the user associated with the user input being processed at runtime). Thus, the trained model 510 may be trained using past utterance data associated with multiple users, and during runtime the trained model 510 processes past utterance data associated with the user that provided the user input.

The system(s) 120 determines first dialog session data representing a first dialog session between a first user (e.g., user 5a) and a first device (e.g., device 110a). The system(s) 120 determines second dialog session data representing a second dialog session between a second user (e.g., user 5b) and a second device (e.g., device 110b). The dialog session data may include text data representing an initial user input/utterance and a subsequent user input/utterance. The initial user input may be associated with an indication that it resulted in an error during speech processing. The subsequent user input may be a rephrase of the initial user input that resulted in successful speech processing.

The system(s) 120 determines training data including at least the first dialog session data and the second dialog session data. The system(s) 120 may include the first and second dialog session data in the training data based on the subsequent user input being a successful rephrase of the initial user input. The system(s) 120 generates the trained model using the training data. In an example embodiment, the trained model is a neural network. The trained model is configured, using data from multiple users, to determine whether a user input should be rephrased or rewritten based on other successful user inputs. During runtime, the trained model is executed using the instant user input and past user inputs spoken by the user who provided the instant user input. Thus the present system leverages a user's historical inputs to determine whether the instant user input should be rephrased for that user.

The training data may also include context data relating to the utterances/user inputs included in the dialog session data. The context data may indicate a device type that received the user input, a device location that received the user input, time when the user input was received, and the like.

Figure 9:
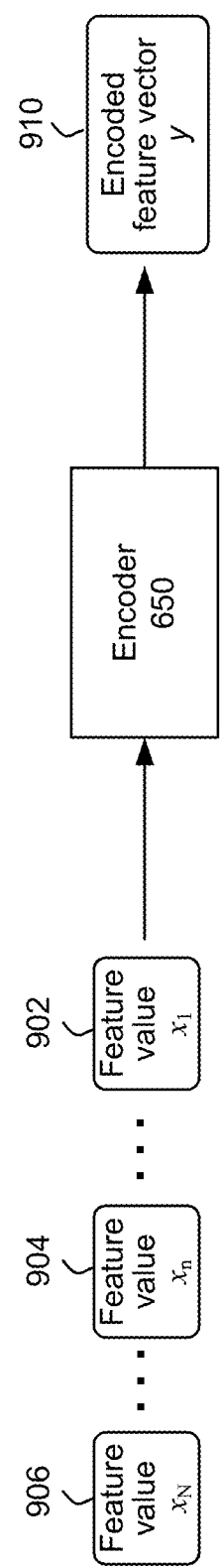
FIG. 9 illustrates operation of an encoder according to embodiments of the present disclosure.

FIG. 9 illustrates feature data values 902-906 being processed by an encoder 650 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence toy, with y being a F-dimensional vector. F is a fixed length of the vector and is configurable depending on user of the encoded vector and other system configurations. Any particular encoder 650 will be configured to output vectors of the same size, thus ensuring a continuity of output encoded vector size from any particular encoder 650 (though different encoders may output vectors different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a recurrent neural network (RNN), for example as an long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward), bi-linear, essentially the concatenation of a forward and a backward embedding, or tree, based on parse-tree of the sequence, In addition, an attention model can be used, which is another RNN or DNN that learns to "attract" attention to certain parts of the input. The attention model can be used in combination with the above methods of consuming the input.

FIG. 9 illustrates operation of the encoder 650. The input feature value sequence, starting with feature value $x_1$ 902, continuing through feature value $x_n$ 904 and concluding with feature value $x_N$ 906 is input into the encoder 650. The encoder 650 may process the input feature values as noted above. The encoder 650 outputs the encoded feature vector y 910, which is a fixed length feature vector of length F. An encoder such as 650 may be used with speech processing as indicated herein.

A word sequence is usually represented as a series of one-hot vectors (i.e., a N-sized vector representing the N available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

Thus components of the system (such as the alternate utterance service component 285) may be configured to use word embeddings in their operations. A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then create multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to compare analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 10:
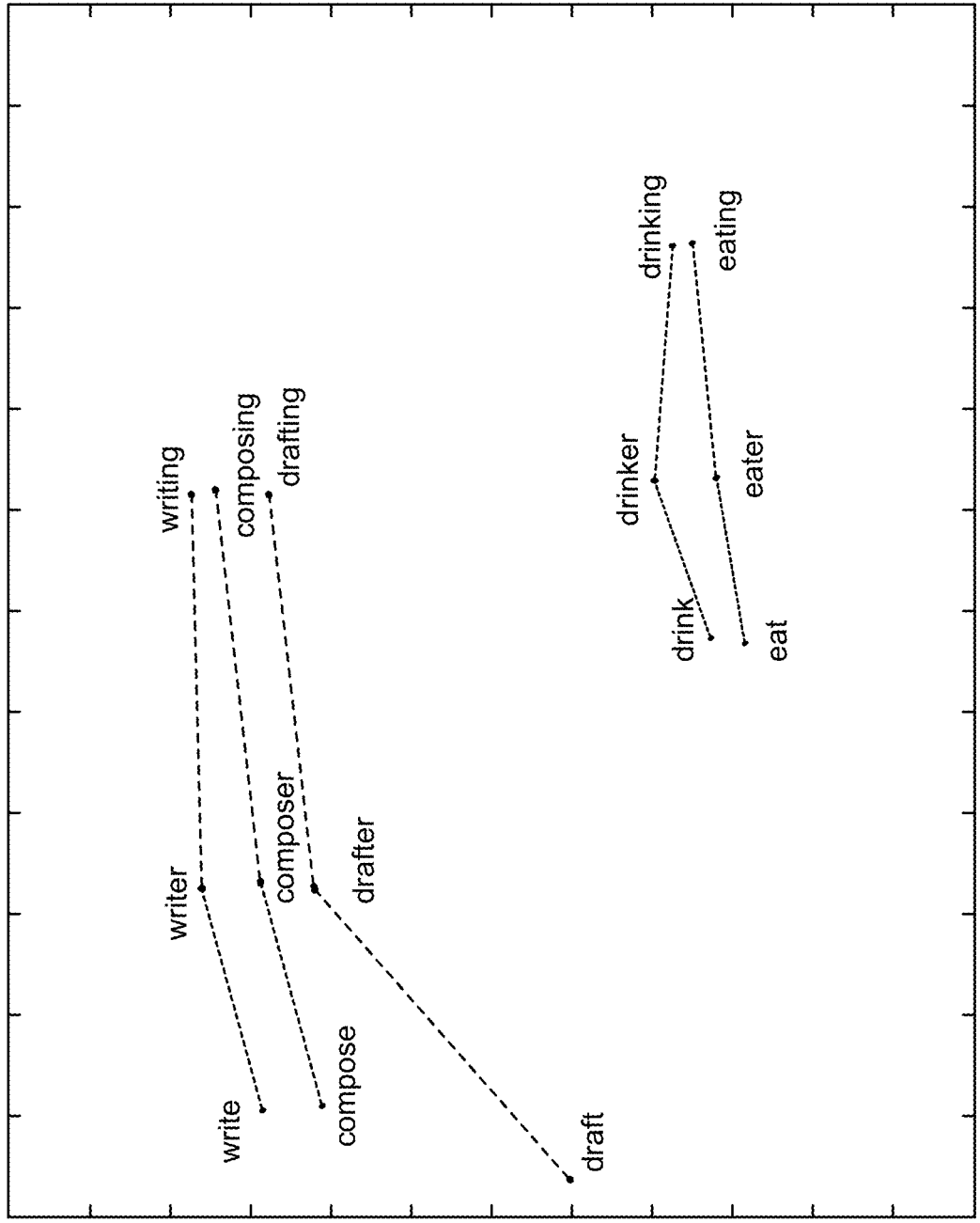
FIG. 10 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 10 illustrates a number of words in a hypothetical vector space where each point represents the vector location for the particular word. Although illustrated as located in a two-dimensional graph for discussion purposes, the usage vectors for the words illustrated in FIG. 10 would be in a high dimensional space. Further, FIG. 10 is shown for example purposes only and the vector locations/relationships do not necessarily reflect a true graphing of the usage of the illustrated words.

As illustrated in FIG. 10, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 10. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Creating word embeddings may be an intensive process and thus a pre-trained word embedding system may be used for multiple NLU processes. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, and others.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The trained model 510 may take many forms, including a neural network. A neural network may include a number of layers, from input layer 1 through output layer N. Each layer is configured to output a particular type of data and output another type of data. For example, a neural network illustrated may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from the penultimate layer.

While values for the input data/output data of a particular layer are not known until a neural network is actually operating during runtime, the data describing the neural network describes the structure and operations of the layers of the neural network.

A neural network may be structured with an input layer, middle layer(s), and an output layer. The middle layer(s) may also be known as the hidden layer(s) or hidden state of the neural network. Each node of the hidden layer is connected to each node in the input layer and each node in the output layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. Each node of the input layer connects to each node of the hidden layer. Each node of the hidden layer connects to each node of the output layer. As illustrated, the output of the hidden layer is fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 7 the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 11:
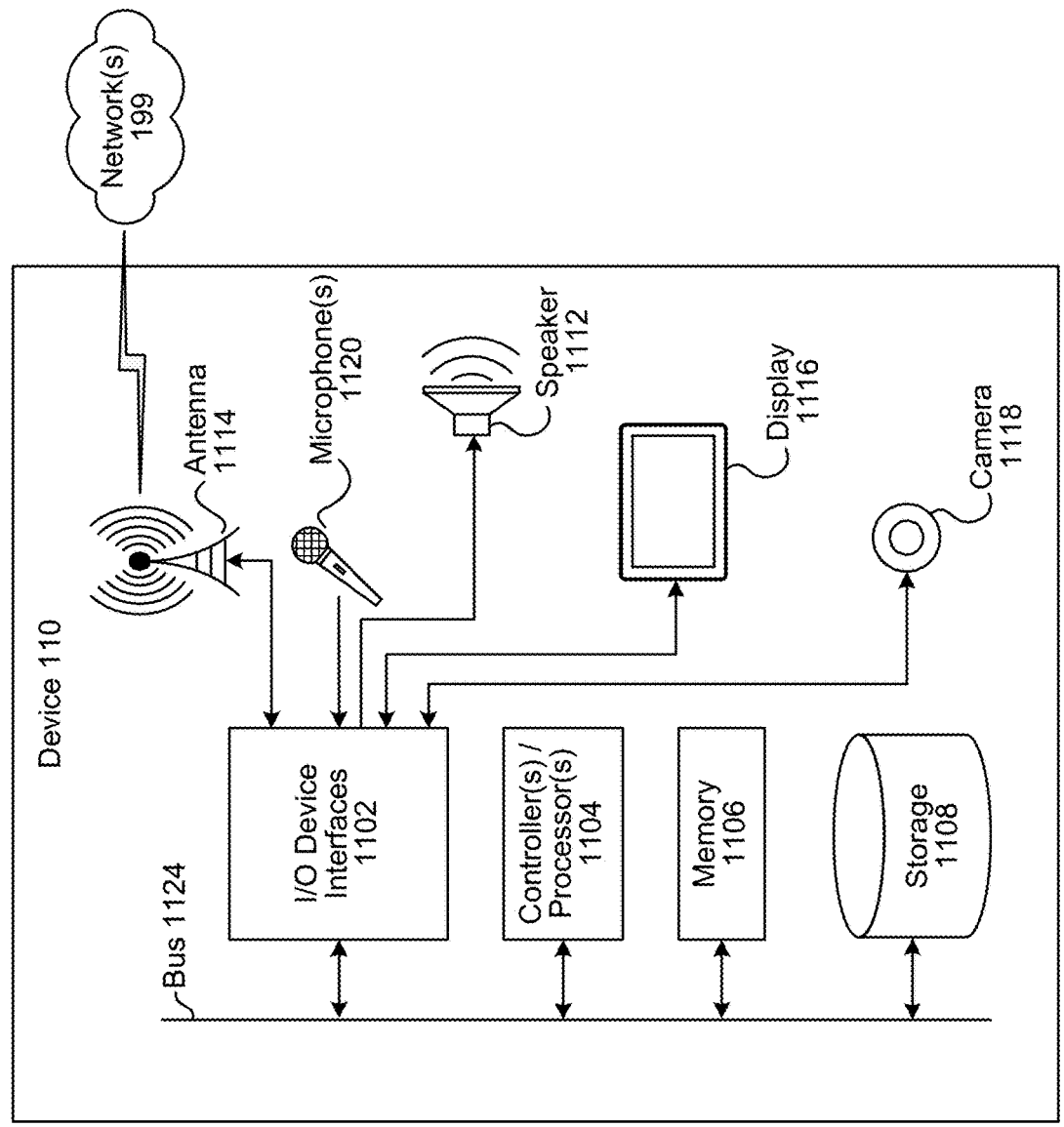
FIG. 11 is a block diagram conceptually illustrating example components of a device according to embodiments of the present disclosure.
Figure 12:
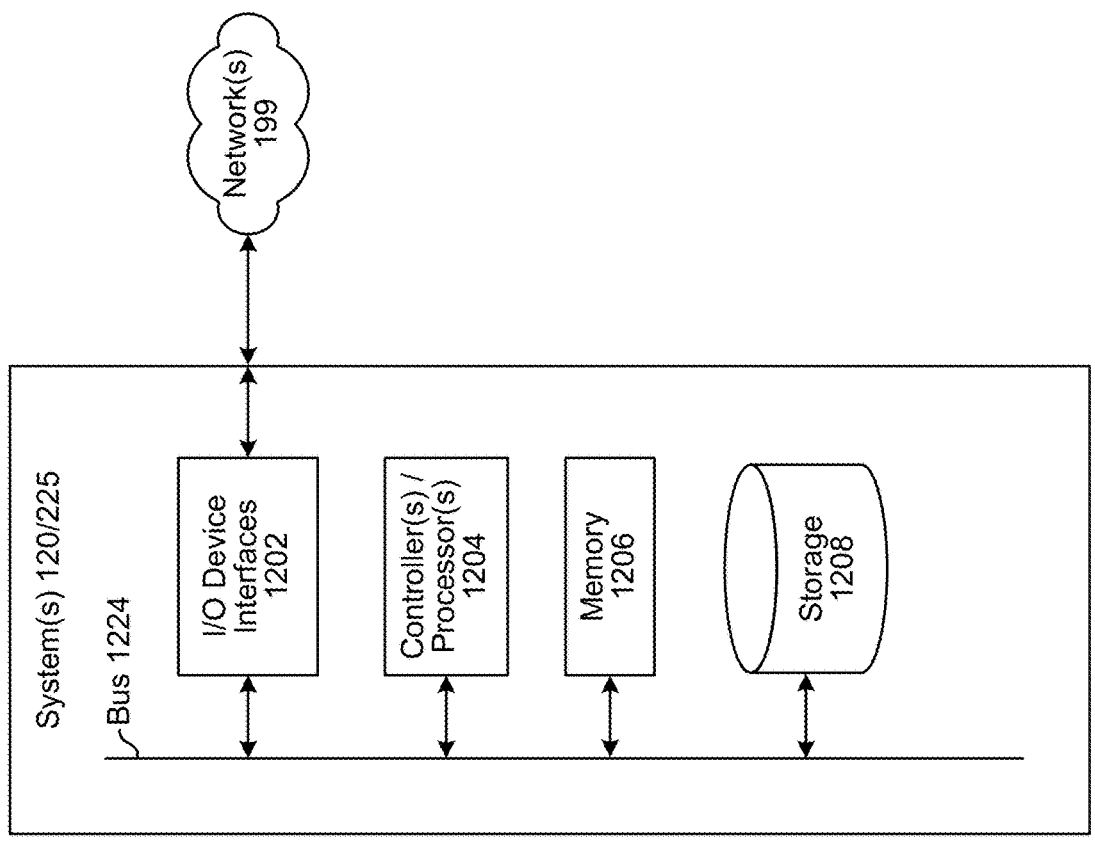
FIG. 12 is a block diagram conceptually illustrating example components of a system according to embodiments of the present disclosure.

FIG. 11 is a block diagram conceptually illustrating a device 110 that may be used with the system. FIG. 12 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/225) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1102/1202).

Computer instructions for operating each device (110/120/225) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/225) includes input/output device interfaces (1102/1202). A variety of components may be connected through the input/output device interfaces (1102/1202), as will be discussed further below. Additionally, each device (110/120/225) may include an address/data bus (1124/1224) for conveying data among components of the respective device. Each component within a device (110/120/225) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1102/1202), processor(s) (1104/1204), memory (1106/1206), and/or storage (1108/1208) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 13:
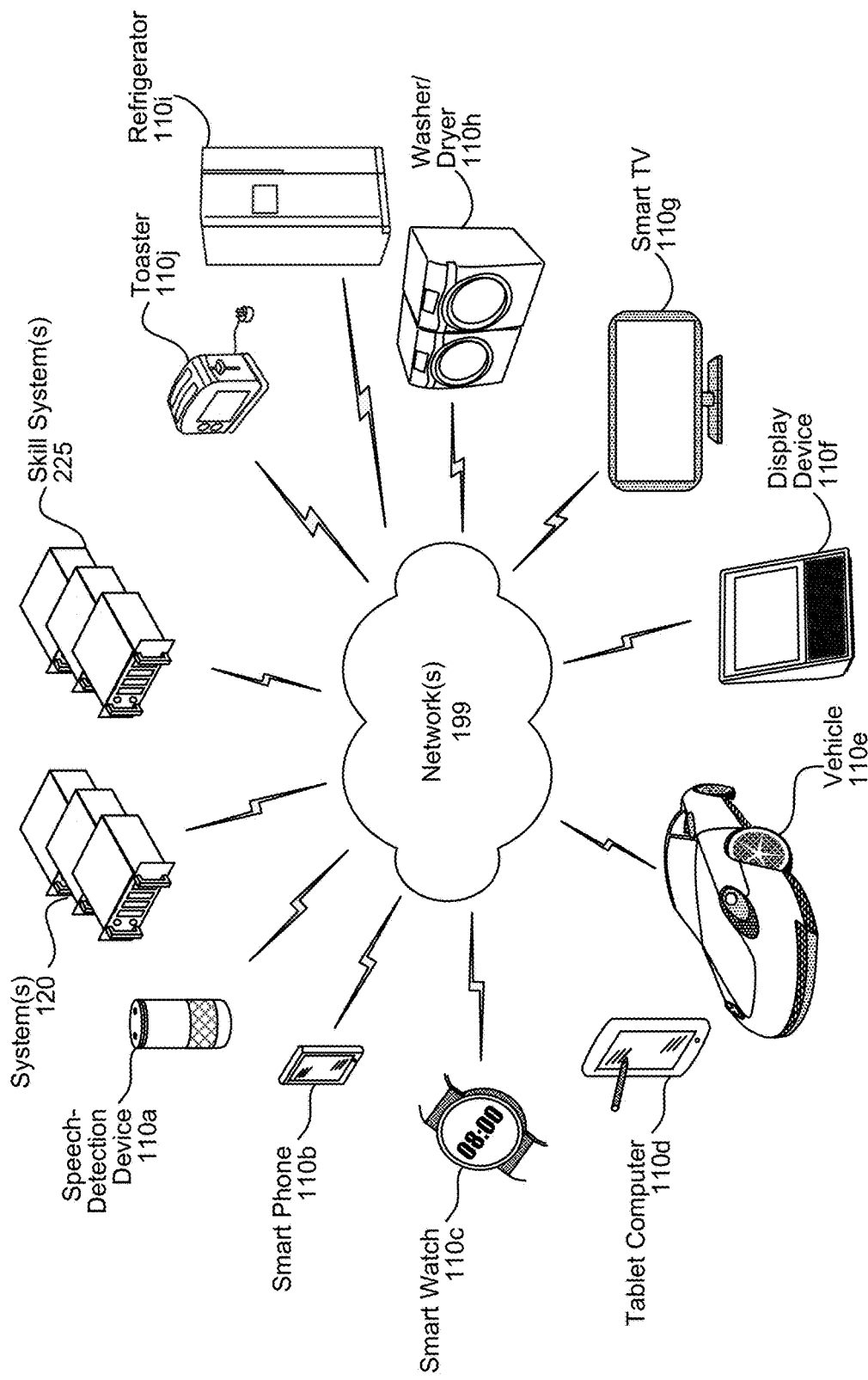
FIG. 13 illustrates an example of a computer network for use with the speech processing system.

As illustrated in FIG. 13, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving audio data representing an input utterance, the audio data corresponding to a user profile;
   performing ASR processing on the audio data to determine:
      first ASR data representing a first hypothesis potentially corresponding to the input utterance, the first ASR data including first text data and a first score, and
      second ASR data representing a second hypothesis potentially corresponding to the input utterance, the second ASR data including second text data and a second score;
   determining data representing an uncertainty exists with respect to ASR processing, the data indicating that the first score and the second score are below a threshold confidence level;
   in response to determining the data representing the uncertainty exists, receiving historical utterance data associated with the user profile, the historical utterance data comprising third ASR data representing a past utterance and frequency data indicating a number of times the past utterance was spoken within a time period;
   processing, using a trained model, the first ASR data, the second ASR data and the historical utterance data to determine fourth ASR data potentially corresponding to the input utterance; and
   generating output data using the fourth ASR data.

2. The computer-implemented method of claim 1, further comprising:
   processing the first ASR data to determine a first feature vector;
   processing the second ASR data to determine a second feature vector;
   determining an average feature vector using the first feature vector and the second feature vector;
   processing the third ASR data to determine a third feature vector;

processing, using an attention model, the average feature vector and the third feature vector to determine a fourth feature vector; and determining a concatenated vector using the fourth feature vector and the third feature vector;

wherein processing using the trained model comprises processing, using the trained model, the concatenated vector to determine the fourth ASR data.

3. The computer-implemented method of claim 1, further comprising prior to receiving the audio data:

receiving first utterance pair data associated with a second user profile and a first historical utterance, the first utterance pair data including fifth ASR data that resulted in a speech processing error and sixth ASR data that resulted in successful speech processing;

receiving second utterance pair data associated with a third user profile and a second historical utterance, the second utterance pair data including seventh ASR data that resulted in a speech processing error and eighth ASR data that resulted in successful speech processing;

storing the first utterance pair data;

storing the second utterance pair data; and generating the trained model using first utterance pair data and the second utterance pair data.

4. The computer-implemented method of claim 1, further comprising:

determining a first time corresponding to receipt of the input utterance;

determining a second time corresponding to receipt of the past utterance; and determining that the first time and the second time are within the time period, wherein processing using the trained model comprises processing the first ASR data, the second ASR data, the historical utterance data and the second time to determine the fourth ASR data.

5. A computer-implemented method comprising:

receiving audio data corresponding to an input utterance associated with a user profile;

performing speech recognition processing on the audio data to determine first automatic speech recognition (ASR) data potentially corresponding to the input utterance, the first ASR data associated with a first confidence level;

performing speech recognition processing on the audio data to determine second ASR data potentially corresponding to the input utterance, the second ASR data associated with a second confidence level;

determining an uncertainty exists based on the first confidence level and the second confidence level satisfying a condition;

in response to determining the uncertainty exists, receiving historical utterance data associated with the user profile, the historical utterance data corresponding to a first past utterance, wherein the historical utterance data includes first data indicating a number of times the first past utterance was spoken within a time period;

processing, using a machine learning model, the first ASR data, the second ASR data, and the historical utterance data to determine third ASR data potentially corresponding to the input utterance; and generating output data using the third ASR data.

6. The computer-implemented method of claim 5, further comprising:

determining a first time indicating when the input utterance was received;

determining a second time indicating when the first past utterance was received;

determining that the first time and the second time are within the time period; and wherein receiving the historical utterance data comprises receiving historical ASR data representing the first past utterance, and wherein processing the first ASR data, the second ASR data and the historical ASR data comprises processing, using the machine learning model, the first ASR data, the second ASR data, the historical ASR data and the first data.

7. The computer-implemented method of claim 5, further comprising:

processing the first ASR data to determine a first feature vector;

processing the second ASR data to determine a second feature vector;

processing the historical utterance data to determine a third feature vector;

determining an average feature vector using the first feature vector and the second feature vector;

processing, using an attention model, the average feature vector and the third feature vector to determine a fourth feature vector; and determining a concatenated vector using the fourth feature vector and the third feature vector, wherein processing the first ASR data, the second ASR data and the historical ASR data comprises processing, using the machine learning model, the concatenated vector to determine the third ASR data.

8. The computer-implemented method of claim 5, further comprising:

processing profile data associated with the user profile to determine a first past utterance spoken with the time period;

determining, using the profile data, that the first past utterance resulted in successful speech processing; and determining to receive the historical utterance data corresponding to the first past utterance.

9. The computer-implemented method of claim 5, further comprising:

performing, using the first ASR data, natural language understanding (NLU) to determine a first NLU hypothesis;

performing, using the third ASR data, NLU to determine a second NLU hypothesis;

determining that the first NLU hypothesis results in an error; and determining to generate the output data using the second NLU hypothesis.

10. The computer-implemented method of claim 5, wherein determining that the uncertainty exists comprises:

determining a value representing a difference between the first confidence level and the second confidence level;

determining that the value meets a threshold value; and determining that the uncertainty exists based on the value meeting the threshold value.

11. The computer-implemented method of claim 5, further comprising prior to receiving the audio data:

receiving first utterance pair data associated with a second user profile, the first utterance pair data including first historical ASR data corresponding to a first historical utterance and second historical ASR data corresponding to the first historical utterance, wherein the first historical ASR data resulted in a speech processing error and the second historical ASR data resulted in successful speech processing;
receiving second utterance pair data associated with a third user profile, the second utterance pair data including third historical ASR data corresponding to a second historical utterance and fourth historical ASR data corresponding to the second historical utterance, wherein the third historical ASR data resulted in a speech processing error and the fourth historical ASR data resulted in successful speech processing;
storing training data comprising the first utterance pair data and the second utterance pair data; and
generating the machine learning model using the training data.

12. A system comprising:
at least one processor; and
at least one memory including instructions that, when executed by the at least one processor, cause the system to:
receive audio data corresponding to an input utterance associated with a user profile;
perform speech recognition processing on the audio data to determine first automatic speech recognition (ASR) data potentially corresponding to the input utterance, the first ASR data associated with a first confidence level;
perform speech recognition processing on the audio data to determine second ASR data potentially corresponding to the input utterance, the second ASR data associated with a second confidence level;
determine an uncertainty exists based on the first confidence level and the second confidence level satisfying a condition;
in response to determining the uncertainty exists, receive historical utterance data associated with the user profile, the historical utterance data corresponding to a first past utterance, wherein the historical utterance data includes first data indicating a number of times the first past utterance was spoken within a time period;
process, using a machine learning model, the first ASR data, the second ASR data and the historical utterance data to determine third ASR data potentially corresponding to the input utterance; and
generate output data using the third ASR data.

13. The system of claim 12, wherein the instructions that, when executed by the at least one processor, further cause the system to:
determine a first time indicating when the input utterance was received;
determine a second time indicating when the first past utterance was received;
determine that the first time and the second time are within the time period; and
wherein the instructions to receive the historical utterance data further cause the system to receive historical ASR data representing the first past utterance, and
wherein the instructions to process the first ASR data, the second ASR data and the historical ASR data further cause the system to process, using the machine learning model, the first ASR data, the second ASR data, the historical ASR data and the first data.

14. The system of claim 12, wherein the instructions that, when executed by the at least one processor, further causes the system to:
process the first ASR data to determine a first feature vector;
process the second ASR data to determine a second feature vector;
process the historical utterance data to determine a third feature vector;
determine an average feature vector using the first feature vector and the second feature vector;
process, using an attention model, the average feature vector and the third feature vector to determine a fourth feature vector; and
determine a concatenated vector using the fourth feature vector and the third feature vector,
wherein the instructions to process the first ASR data, the second ASR data and the historical ASR data further causes the system to process, using the machine learning model, the concatenated vector to determine the third ASR data.

15. The system of claim 12, wherein the instructions that, when executed by the at least one processor, further causes the system to:
process profile data associated with the user profile to determine a first past utterance spoken with the time period;
determine, using the profile data, that the first past utterance resulted in successful speech processing; and
determine to receive the historical utterance data corresponding to the first past utterance.

16. The system of claim 12, wherein the instructions that, when executed by the at least one processor, further cause the system to:
perform, using the first ASR data, natural language understanding (NLU) to determine a first NLU hypothesis;
perform, using the third ASR data, NLU to determine a second NLU hypothesis;
determine that the first NLU hypothesis results in an error; and
determine to generate the output data using the second NLU hypothesis.

17. The system of claim 12, wherein the instructions that, when executed by the at least one processor, cause the system to determine that an uncertainty exists further cause the system to:
determine a value representing a difference between the first confidence level and the second confidence level;
determine that the value meets a threshold value; and
determine that the uncertainty exists based on the value meeting the threshold value.

18. The system of claim 12, wherein the instructions that, when executed by the at least one processor, further cause the system to, prior to receiving the audio data:
receive first utterance pair data associated with a second user profile, the first utterance pair data including first historical ASR data corresponding to a first historical utterance and second historical ASR data corresponding to the first historical utterance, wherein the first historical ASR data resulted in a speech processing error and the second historical ASR data resulted in successful speech processing;
receive second utterance pair data associated with a third user profile, the second utterance pair data including third historical ASR data corresponding to a second historical utterance and fourth historical ASR data corresponding to the second historical utterance, wherein the third historical ASR data resulted in a speech processing error and the fourth historical ASR data resulted in successful speech processing;
store training data comprising the first utterance pair data and the second utterance pair data; and
generate the machine learning model using the training data.

* * * * *